US011890627B2

(12) United States Patent
Ballot et al.

(10) Patent No.: US 11,890,627 B2
(45) Date of Patent: Feb. 6, 2024

(54) COUPLING DEVICE

(71) Applicant: FLOCON, Inc., Woodstock, IL (US)

(72) Inventors: Stephan M. Ballot, Barrington Hills, IL (US); Fred M. Ekstrom, Algonquin, IL (US)

(73) Assignee: FLOCON, INC., Woodstock, IL (US)

( * ) Notice: Subject to any disclaimer, the term of this patent is extended or adjusted under 35 U.S.C. 154(b) by 0 days.

(21) Appl. No.: 17/061,606

(22) Filed: Oct. 2, 2020

(65) Prior Publication Data

US 2021/0101164 A1 Apr. 8, 2021

Related U.S. Application Data

(60) Provisional application No. 62/910,845, filed on Oct. 4, 2019.

(51) Int. Cl.

| | |
|---|---|
| ***B65D 8/00*** | (2006.01) |
| ***B65D 1/02*** | (2006.01) |
| ***B65D 6/34*** | (2006.01) |
| ***B05B 11/10*** | (2023.01) |
| ***B65D 83/38*** | (2006.01) |

(52) U.S. Cl.
CPC ...... *B05B 11/1047* (2023.01); *B05B 11/1059* (2023.01); *B65D 1/0246* (2013.01); *B65D 11/04* (2013.01); *B65D 83/38* (2013.01); *B65D 11/22* (2013.01)

(58) Field of Classification Search
CPC .... B65D 51/0246; B65D 11/04; B65D 83/38; B65D 11/22; B65D 50/046; B65D 50/048; B65D 81/20
USPC ........................................................... 215/43
See application file for complete search history.

(56) References Cited

U.S. PATENT DOCUMENTS

| | | | |
|---|---|---|---|
| 4,685,820 | A | 8/1987 | Kremer et al. |
| 4,792,252 | A | 12/1988 | Kremer et al. |
| 6,415,961 | B2 | 7/2002 | Bonningue |
| 6,641,320 | B1 | 11/2003 | Ballot |
| 7,374,356 | B2 | 5/2008 | Oike |
| 7,473,045 | B2 | 1/2009 | Dumler |
| 8,753,027 | B2 | 6/2014 | Ballot |
| 8,979,411 | B2 | 3/2015 | Ballot |
| 9,211,756 | B2 | 12/2015 | Ballot |
| 9,346,072 | B2 | 5/2016 | Ballot |
| 9,764,588 | B2 | 9/2017 | Ballot |

(Continued)

*Primary Examiner* — Anthony D Stashick
*Assistant Examiner* — Lauren Kmet
(74) *Attorney, Agent, or Firm* — Frijouf, Rust & Pyle, P.A.

(57) ABSTRACT

A coupling device is disclosed for coupling a container to a closure. The container has a container sidewall extending between a first container end and a second container end. A container undercut is defined in an outer surface of the container sidewall. The closure has a closure sidewall extending between a first closure end and a second closure end. A closure outer sidewall is located radially outward from the closure sidewall and defines a slot between the closure sidewall and the closure outer sidewall. The second container end is received within the slot of the closure. A major projection and a major depression are located between the second container end and the slot of the closure cooperating for securing the closure to the container. A minor projection and a minor depression located between the container sidewall and the closure sidewall for cooperating for additionally securing the closure to the container.

11 Claims, 21 Drawing Sheets

(56) References Cited

U.S. PATENT DOCUMENTS

| | | | | |
|---|---|---|---|---|
| 2006/0261067 | A1* | 11/2006 | Letica ................ | B65D 43/0212<br>220/780 |
| 2013/0206784 | A1* | 8/2013 | Short ................. | B65D 25/2811<br>220/760 |

* cited by examiner

COUPLING DEVICE

CROSS-REFERENCE TO RELATED APPLICATIONS

This application claims benefit of U.S. Patent Provisional application No. 62/910,845 filed Oct. 4, 2019. All subject matter set forth in provisional application No. 62/910,845 is hereby incorporated by reference into the present application as if fully set forth herein.

BACKGROUND OF THE INVENTION

Field of the Invention

This invention relates to the dispensing of liquids and more particularly, this invention relates to an improved coupling between a container and a closure suitable for use with a liquid applicator or liquid dispenser device.

Background of the Invention

Various types of liquid applicator devices have been devised for dispensing a liquid. Some of these liquid applicator devices were used for dispensing an applicator liquid for writing with ink, dye or paint. Among such devices were fountain pens, ball point pens, felt tip pens as well as other types of liquid applicator devices such as brush applicators and the like.

These liquid applicator devices of the prior art have received wide acceptance due in great measure to the convenience of the device. Furthermore, these liquid applicator devices of the prior art had the ability to retain a large quantity of applicator liquid and the ability to supply additional applicator liquid from a liquid container to an applicator tip at the discretion of the user. In addition, the liquid applicator devices were not limited to the dispensing of only writing liquid such as paints, dyes and the like but are capable of dispensing a large variety of applicator liquids including chemicals, perfumes, lubricants and the like.

Continuing efforts have been made in the past to improve the design of the liquid applicator devices. The improved design of the liquid applicator devices have concentrated on the liquid dispensing mechanism and for improving the communication of the liquid from the liquid container to the applicator tip for dispensing the applicator liquid onto a surface. In one example of a liquid applicator device, an applicator liquid flows into a fiber applicator tip only when the liquid applicator device is held upside down and the fiber applicator tip is depressed by a surface to be coated by the applicator liquid.

In many cases, a closure is secured to a liquid container for containing the liquid during shipment and use. If the closure is not adequately secured to a liquid container, the closure may separate from the container spilling the liquid from the container. The following United States patents illustrate a development of the liquid applicator devices.

U.S. Pat. No. 4,685,820 to Kremer et al. discloses an improved applicator device for applying an applicator material such as a liquid or a flowable solid to a surface. The device comprises a material container and a surface applicator for applying the applicator material to the surface. A valve is interposed between the material container and the surface applicator to permit the flow of applicator material to the surface applicator when the valve is in an open position and to inhibit the flow of applicator material to the surface applicator when the valve is in a closed position. The valve includes a valve closure having an internal closure cavity with a first end being connected to the material container and with a second end defining a surface applicator opening therein. The valve element has a distal end portion that extends through the applicator opening of the valve closure when the valve element is biased into the closed position. The surface applicator comprises the distal end portion of the valve element cooperating with the applicator opening when the distal end portion of the valve element is pressed against the surface thereby forming an annular opening for the flow of the applicator material to apply and disperse the applicator material on the surface. U.S. Pat. No. 4,685,820 to Kremer et al. provided a significant step forward in the art of liquid applicator devices.

U.S. Pat. No. 4,792,252 to Kremer et al. discloses a liquid applicator device for applying a liquid such as paint, a perfume, a chemical, a coating or the like to a surface by writing, marking or painting. The liquid applicator device includes a container for the liquid and an applicator dispensing mechanism. The applicator dispensing mechanism includes an inner subassembly having a valve and an outer subassembly having the surface applicator. The valve regulates the flow of the liquid from the container to the surface applicator. The valve of the applicator device may be opened to allow the liquid to flow from the container to the surface applicator upon depression of the surface applicator or upon depression of a valve actuator. The liquid applicator device incorporates an improved sealing member for sealing with the sides of the surface applicator for reducing the flow of the applicator liquid along the side of the surface applicator. The surface applicator may be in the form of a fiber tip, a brush or similar applicator. The applicator dispensing mechanism may be fabricated independent of the attachment to the container. The valve seal has a flexibly mounted tubular extension which holds the inner end of the surface applicator to maintain the liquid seal during lateral movement of the outer end of the surface applicator.

U.S. Pat. No. 6,641,320 to Ballot disclosed an improvement to U.S. Pat. No. 4,685,820 to Kremer et al. comprising an applicator tip having a recess and a generally toroidal retaining ring disposed in the recess of the applicator tip. The recess cooperates with the retaining ring for preventing removal of the applicator tip from the liquid applicator device.

U.S. Pat. No. 8,753,027 to Ballot discloses a liquid applicator device for dispensing an applicator liquid from an applicator liquid container comprising a closure for sealing with the applicator liquid container. A sealing surface is defined in the closure and a valve is disposed within the closure. A spring is located within the closure between a spring retaining step defined in the closure and the valve for biasing the valve into sealing engagement with the sealing surface of the closure for inhibiting the flow of the applicator liquid from the applicator liquid container. A passageway defined in the closure for slidably receiving an applicator tip for engaging with the valve to enable a depression of the applicator tip to displace the valve from the sealing surface of the closure to flow applicator liquid from the applicator liquid container to the applicator tip.

U.S. Pat. No. 8,979,411 to Ballot discloses a liquid applicator comprising a liquid container and a liquid dispensing mechanism having a valve element enabling an axial displacement of an applicator tip to move the valve element into the open position for enabling the applicator tip to apply the liquid to a surface. The improvement comprises an applicator closure having a closure coupling for coupling the applicator closure to a peripheral rim of a container. An optional shield may be secured to the applicator closure for providing protection between the applicator tip and an operator grasping the liquid container.

U.S. Pat. No. 9,211,756 to Ballot discloses a liquid applicator device for applying a liquid from a container to a surface. A closure defining a closure aperture secures the closure to the container. A sealing member sealingly engages with the closure mounting. The sealing member has a tubular sleeve with an applicator slidably disposed within the tubular sleeve. The applicator comprises a hollow interior with an applicator tip defined by an outer applicator portion of the applicator. A biasing member coacts between the closure and the applicator for urging the applicator to form a seal with the sealing member. A depression of the outer applicator portion against the surface displaces the applicator from the sealing member to enable the flow of the liquid from the container to the applicator tip of the applicator.

U.S. Pat. No. 9,346,072 to Ballot discloses a precision liquid applicator for dispensing an applicator liquid from a container onto a surface. The precision liquid applicator comprises a closure defining a terminal orifice and a valve seat. A valve comprises a precision applicator tip extending through the terminal orifice and comprises a valve seal for sealing with the valve seat. A depression of the precision applicator tip onto the surface displaces the valve seal from the sealing surface for providing an annular passageway between the precision applicator tip and the terminal orifice to enable the flow of the applicator liquid onto the surface. A valve stop cooperates with a stop wall for limiting movement of the valve to control a cross-sectional area of the passageway between the precision applicator tip and the terminal orifice and for ensuring the precision applicator tip extends beyond the second end of the closure. The precision liquid applicator is suitable for applying paint into a scratch within a painted surface without excessive application of paint outside of the scratch.

U.S. Pat. No. 9,764,588 to Ballot discloses a liquid applicator device for dispensing an applicator liquid from an applicator liquid container. The liquid applicator device comprises a closure having an internal passageway for sealing with the applicator liquid container. A dispensing mechanism is disposed in the internal passageway of the closure. An applicator located in the passageway engaging with the valve element for enabling a depression of the applicator to displace the valve element from the sealing surface to enable the flow of the applicator liquid from the liquid container into the applicator. A capture extends from the valve element for grasping the applicator for inhibiting removal of the applicator from the passageway.

It is an object of the invention is to provide a semi-permanent and/or permanent seal between a container and a closure with minimum cost.

Another object of the present invention is to provide a coupling device for coupling a closure to a container that requires no additional parts.

Another object of the present invention is to provide a coupling device for coupling a closure to a container that is free from adhesives.

Another object of the present invention is to provide a coupling device for coupling a closure to a container that does not require sonic welding.

Another object of the present invention is to provide a coupling device that is simpler in design and more economical to manufacture.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with the specific embodiments shown in the attached drawings. For the purpose of summarizing the invention, the invention comprises a coupling device for coupling a closure to a container. The container has a container sidewall extending between a first container end and a second container end. A container undercut is defined in an outer surface of the container sidewall defining the second container end forming a reduced cross-section. A container notch is located within the container. A closure has a closure sidewall extending between a first closure end and a second closure end. A closure outer sidewall located radially outward from the closure sidewall defines a slot between the closure sidewall and the closure outer sidewall. The second container end is received within the slot of the closure whereas the first closure end is received within the notch of the container. A major projection and a major depression are located between the second container end and the slot of the closure cooperating for securing the closure to the container. A minor projection and a minor depression are located between the container sidewall and the closure sidewall for cooperating for additionally securing the closure to the container.

In one embodiment of the invention, the plurality of container rib supports an inside surface of the container sidewall. The container notch is located within the container rib. The second container end is received within the slot of the closure prior to the first closure end being receivable within the notch of the container.

In another embodiment of the invention, a second minor projection engages a second minor depression between the container sidewall and the closure sidewall for locking the closure to the container. The second minor projection and the second minor depression are opposite to the first minor projection and the first minor depression.

In still another embodiment of the invention, the closure outer sidewall is resilient for enabling the resilient engagement between the major projection and the major depression. Preferably, the container and the closure are formed from a deformable polymeric material. The container notch biases the closure sidewall against the container sidewall.

In another embodiment of the invention, a closure receptacle is coupled to the closure. A closure pump channel is within the closure receptacle. A pump engages within the closure pump channel for coupling the pump to the closure receptacle and is configured for dispensing from the container.

In another embodiment of the invention, a closure pump slot coupled to the closure receptacle. A pump mounting wall is coupled to the pump. The pump mounting wall is received within the closure pump slot for coupling the pump to the closure.

In another embodiment of the invention, the closure receptacle includes a lower male body and an upper female body. The lower male body biases the pump against the upper female body.

In another embodiment of the invention, a closure annular channel is in the closure for receiving an actuator.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments may be modified for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 2:
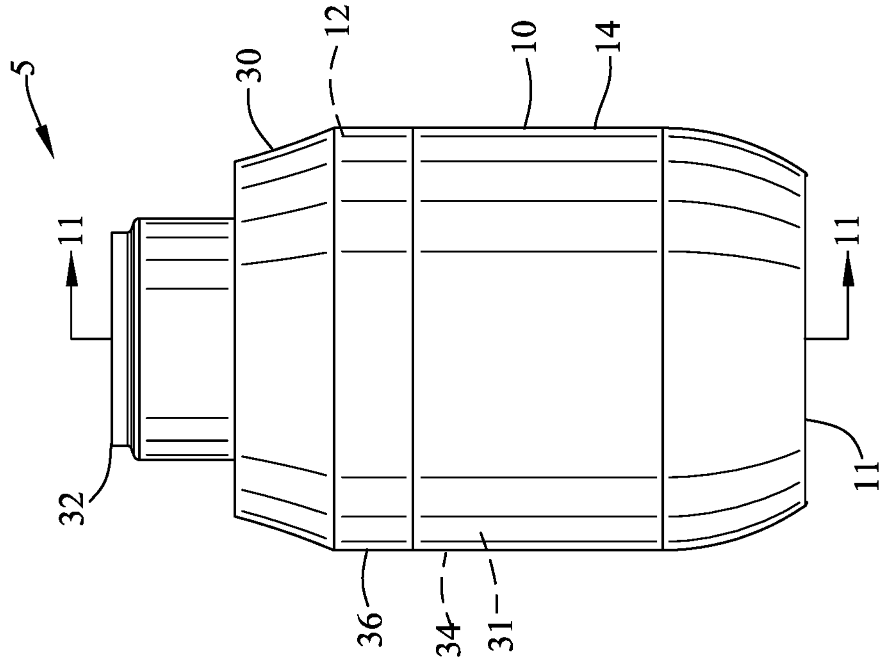
FIG. 2 is a side view of FIG. 1.
Figure 1:
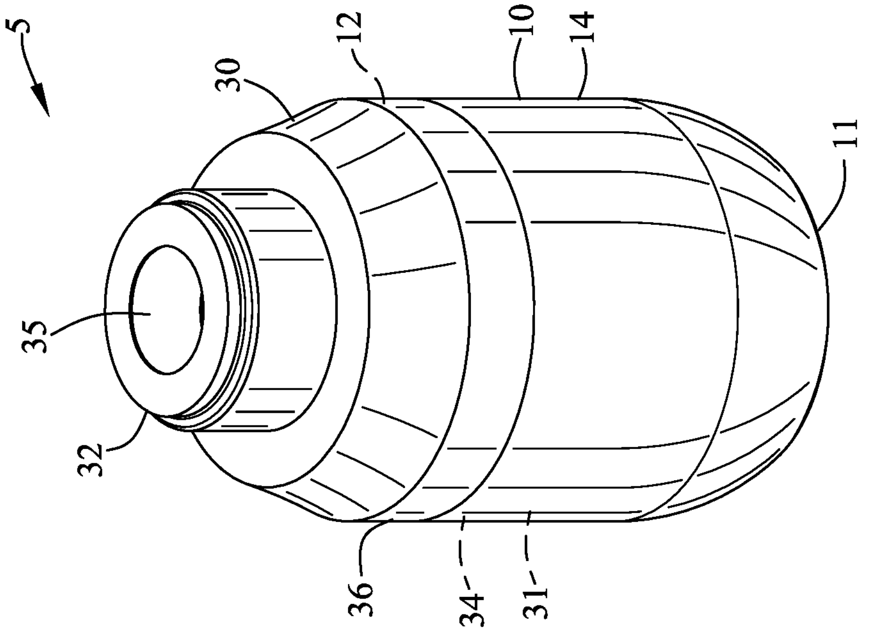
FIG. 1 is an isometric top view of a first embodiment of a closure connected to a liquid container.
Figure 3:
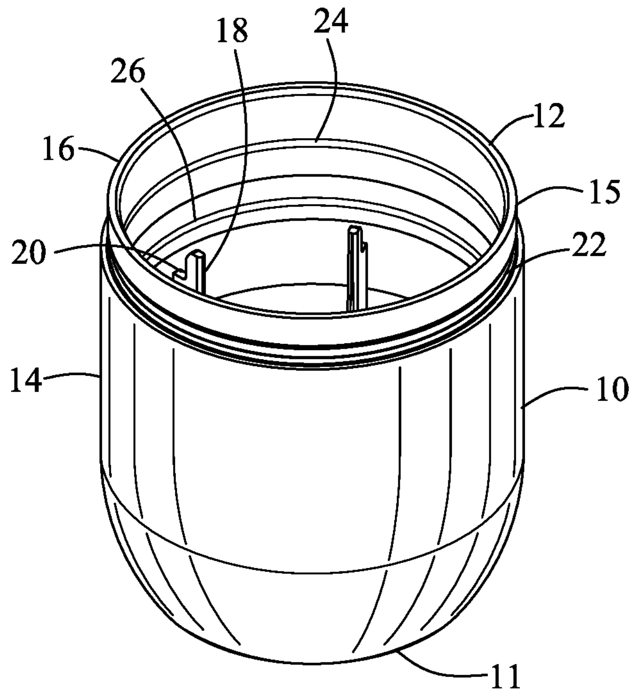
FIG. 3 is an isometric top view of the liquid container of FIGS. 1-2.
Figure 4:
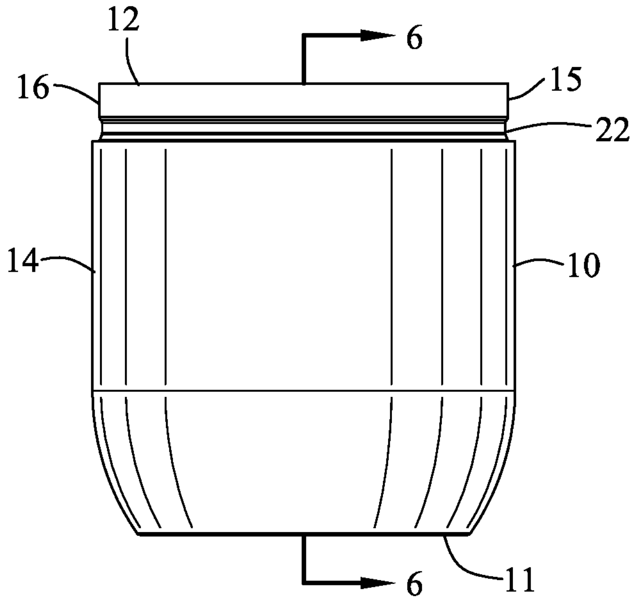
FIG. 4 is a side view of the liquid container of FIG. 3.

FIGS. 1-38 are views of coupling device 5 illustrating a container 10 with a closure 30 secured thereto. FIGS. 1-16 and 19 illustrate a first embodiment of the coupling device 5. FIGS. 21-38 illustrate a second embodiment of the coupling device 5.

The container 10 and the closure 30 are explained herein with reference to a container containing a liquid (not shown) but it should be understood that the container 10 and the closure 30 may be used to contain granular materials, powders, gels and the like. Furthermore, it should be understood that container 10 and the closure 30 may take various shapes and sizes while incorporating the coupling device 5 of the present invention. The coupling device 5 disclosed herein is designed for semi-permanently securing the closure 30 to the container 10.

FIGS. 3-6 illustrate the container 10 in greater detail. The container 10 is formed from a deformable polymeric material. The container 10 has a container sidewall 14 extending between a first container end 11 and a second container end 12. In this example, the first container end 11 is a closed end whereas the second container end 12 is an open end. The second container end 12 of the container 10 has an undercut 15 providing a reduced cross-section sidewall 16.

Figure 5:
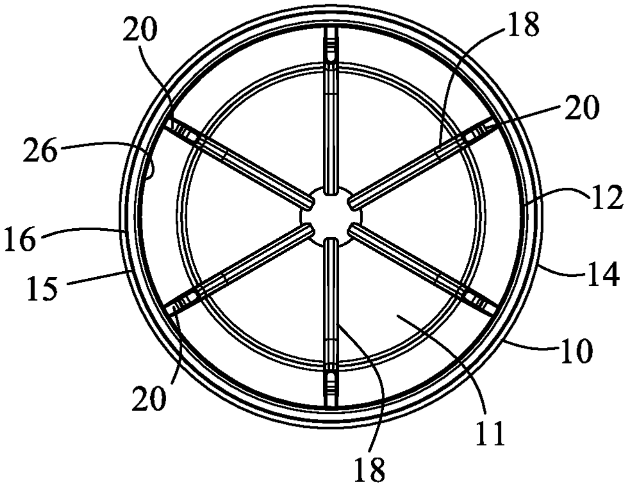
FIG. 5 is a top view of the liquid container of FIG. 4.
Figure 6:
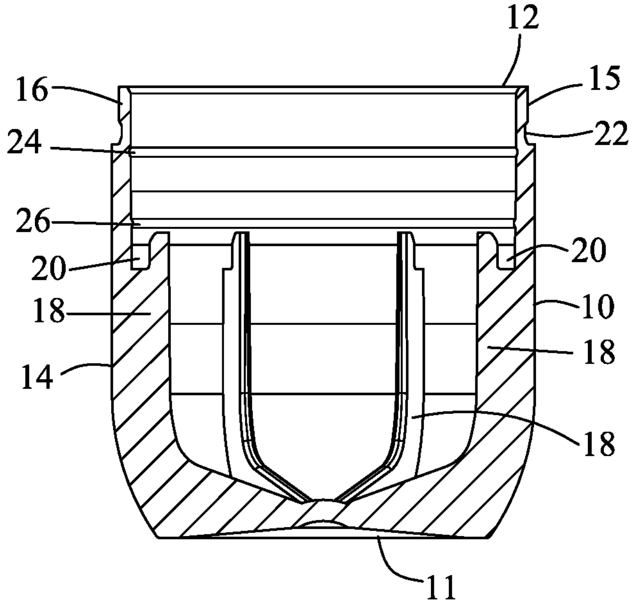
FIG. 6 is a sectional view along line 6-6 in FIG. 4.
Figure 7:
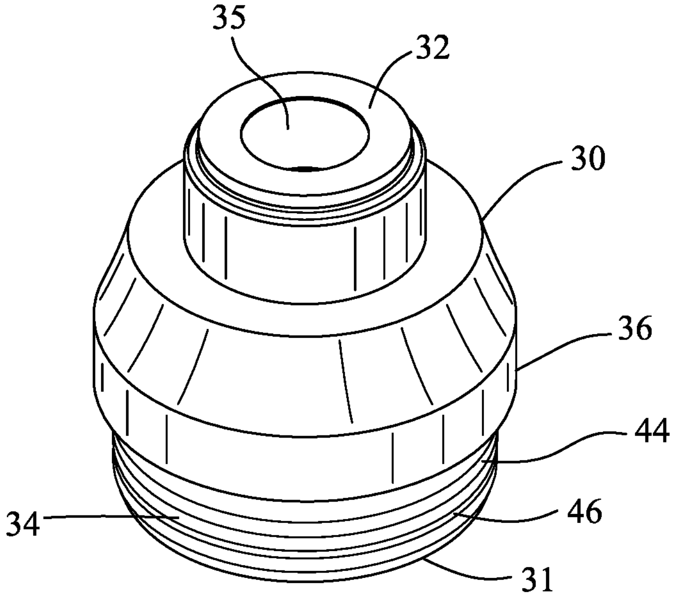
FIG. 7 is an isometric top view of the closure of FIGS. 1-2.
Figure 8:
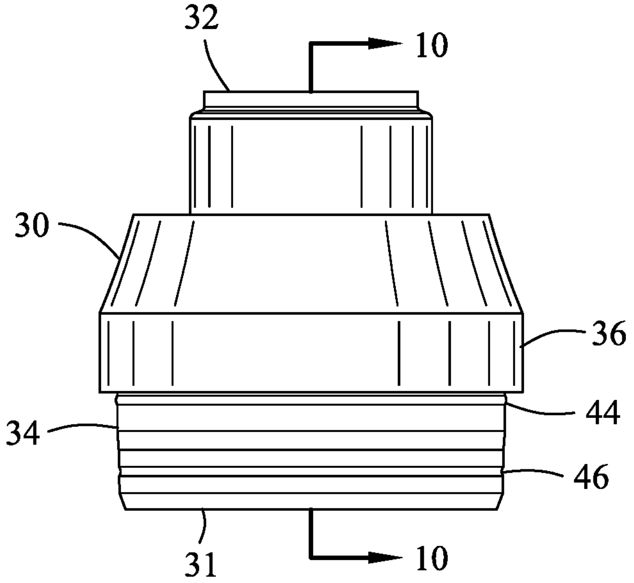
FIG. 8 is a side view of the closure of FIG. 7.
Figure 9:
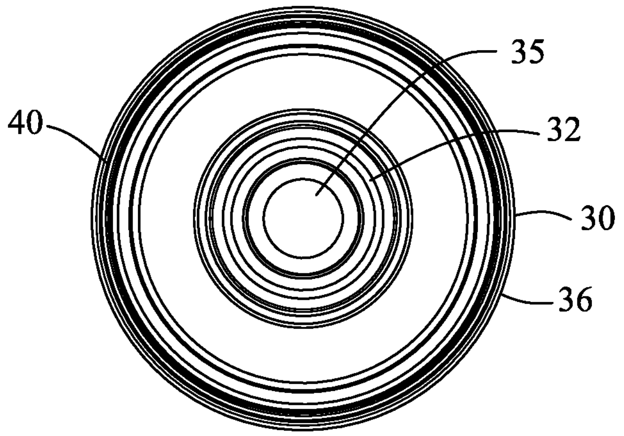
FIG. 9 is a top view of the closure component of FIG. 8.

As best shown in FIGS. 5 and 6, a plurality of container rib 18 are located within the container 10. The plurality of container ribs 18 extend from the closed first container end 11 along the inside surface of the container sidewall 14. The plurality of container ribs 18 provide support between the closed first container end 11 and the container sidewall 14.

Each of the plurality of container ribs 18 defines a notch 20 at the upper end of each of the container ribs 18. The function of the notch 20 will be discussed in greater detail with reference to FIGS. 11-16.

In this example, a major container depression 22 is defined within an outer surface of the reduced cross-section sidewall 16. A minor container depression 24 is defined within an inside surface of the container sidewall 14. As shown in FIGS. 11-16, the major container depression 22 is greater than the minor container depression 24. A second minor container projection 26 is defined within the inside surface of the container sidewall 14. The minor container depression 24 is spaced apart from the second minor container projection 26 along the inside surface of the container sidewall 14.

FIGS. 7-10 illustrate the closure 30 in greater detail. The closure 30 is formed from a deformable polymeric material. The closure 30 has a closure sidewall 34 extending between a first closure end 31 and a second closure end 32. In this example, the first closure end 31 is an open end whereas the second container end 32 defines an internal channel 35. The internal channel 35 is used for receiving a dispensing device (not shown) but it should be understood that the second closure end 32 may be a closed end as should be well known by those skilled in the art.

An outer closure sidewall 36 is located radially outward from the closure sidewall 34 defining a slot 40 between the closure sidewall 34 and the outer sidewall 36. The closure outer sidewall 36 is resilient for resiliently engaging with the container 10. The function of the closure outer sidewall 36 and the slot 40 will be discussed in greater detail with reference to FIGS. 11-16.

Figure 10:
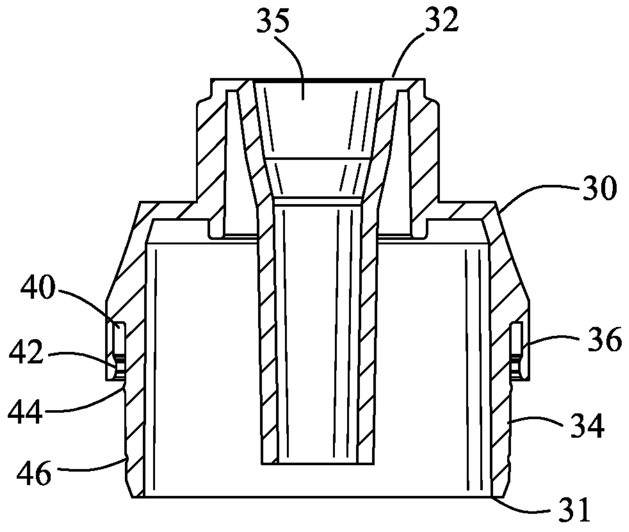
FIG. 10 is a sectional view along line 10-10 in FIG. 8.

As best shown in FIG. 10, a major closure projection 42 is defined on an inner surface of the outer closure sidewall 36. A minor closure projection 44 is defined within an outside surface of the closure sidewall 34. As shown in FIGS. 11-16, the major closure projection 42 is greater than the minor closure projection 44. A second minor closure depression 46 is defined within the outside surface of the closure sidewall 34. The minor closure projection 44 is spaced apart from the second minor closure depression 46 along the outside surface of the closure sidewall 34. The minor container depression 24 and the second minor container projection 26 of the container 10 are spaced similarly to the minor closure projection 44 and the second minor closure depression 46 of the closure 30. As shown in FIGS. 11-16, the major closure projection 42 is greater than the second minor closure projection 26. The major container depression 22 is greater than the second minor container depression 46 as shown in FIGS. 11-16.

Figure 11:
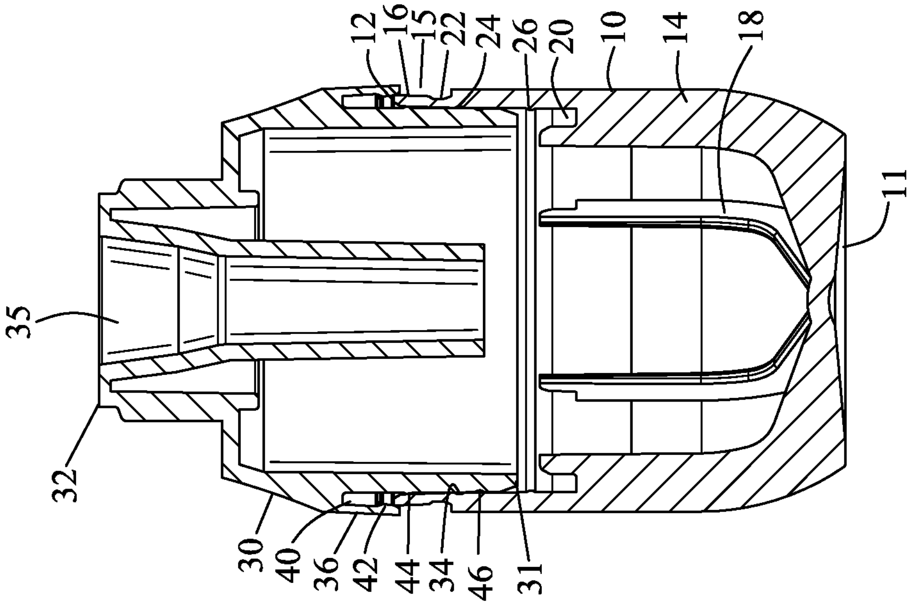
FIG. 11 is an enlarged sectional view along line 11-11 in FIG. 2 with the closure position adjacent to the container.
Figure 12:
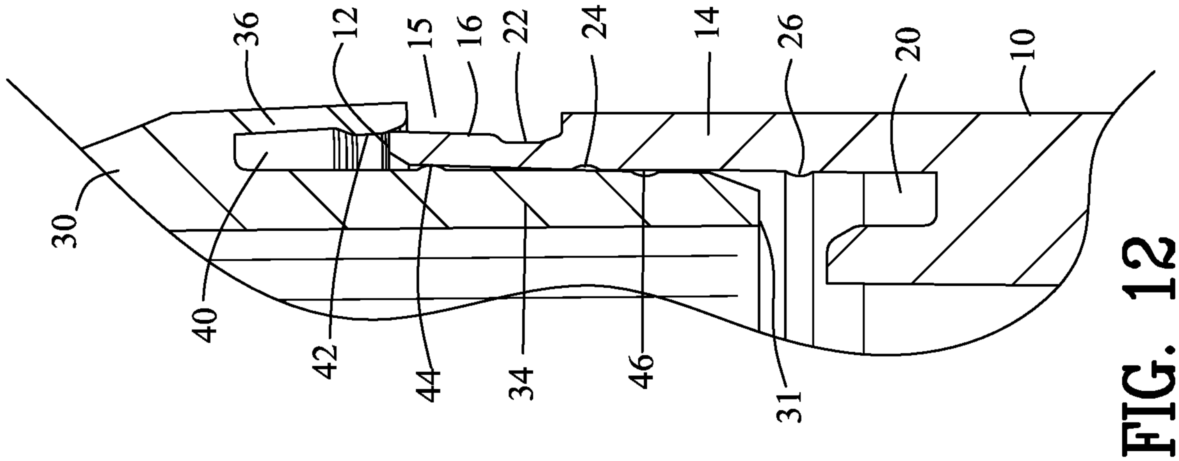
FIG. 12 is a magnified view of a portion of FIG. 11.

FIGS. 11 and 12 illustrate the closure 30 position adjacent to the container 10. The closure sidewall 34 is inserted partially within the container sidewall 14. Preferably, the closure sidewall 34 forms a sliding seal with the container sidewall 14 to align the closure 30 to the container sidewall 14. The closure sidewall 34 is inserted within the container sidewall 14 prior to the reduced cross-section sidewall 16 of the container 10 entering into the closure slot 40.

Figure 14:
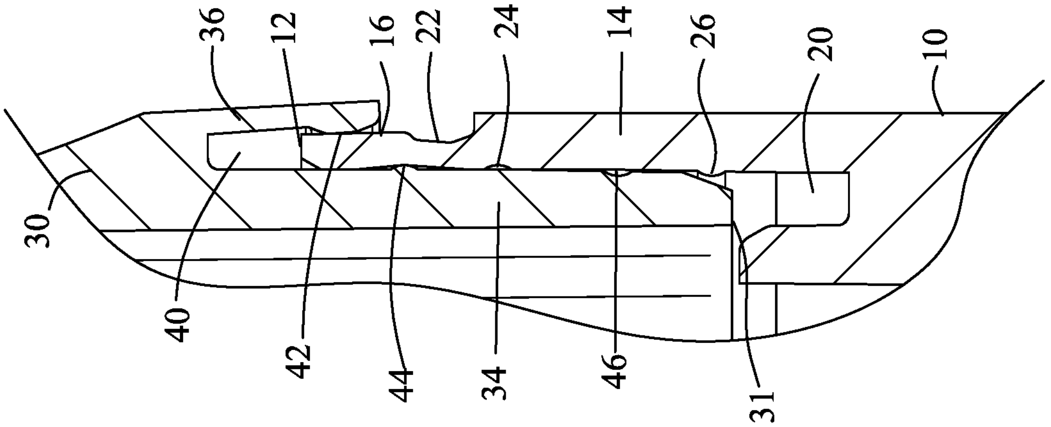
FIG. 14 is a magnified view of a portion of FIG. 13.
Figure 13:
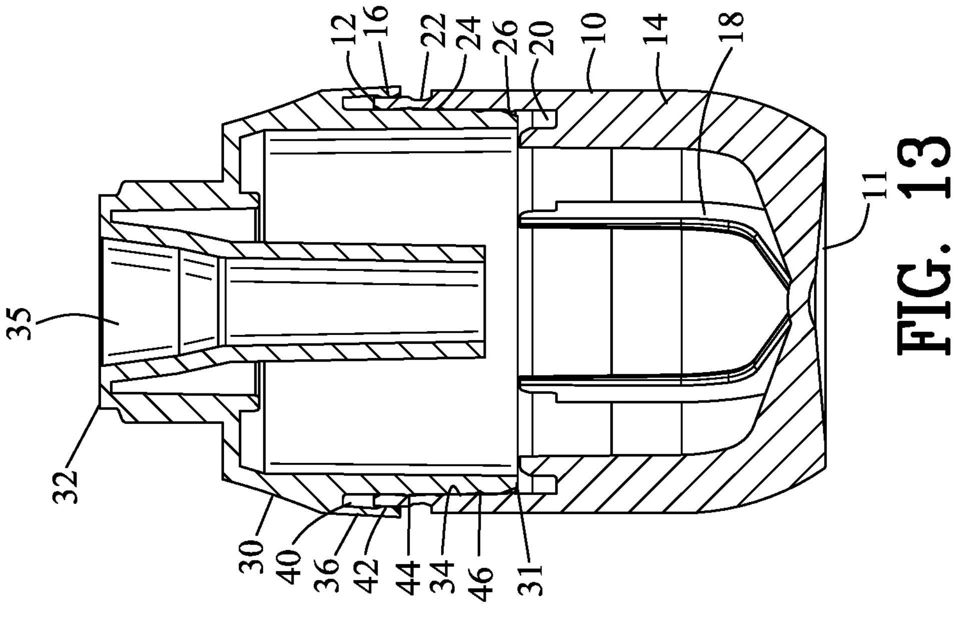
FIG. 13 is a view similar to FIG. 11 with the closure partially inserted into the container.

FIGS. 13 and 14 illustrate the closure 30 partially inserted into the container 10. The reduced cross-section sidewall 16 of the container 10 is shown entering into the closure slot 40. The reduced cross-section sidewall 16 of the container 10 enters the closure slot 40 prior to the first closure end 31 entering into the notch 20 of the container 10. The major projection 42 of the closure 30 engages with the reduced cross-section sidewall 16 of the container 10 and results in the outer sidewall 36 of the closure 30 flexing radially outwardly as best shown in FIG. 14.

Figure 16:
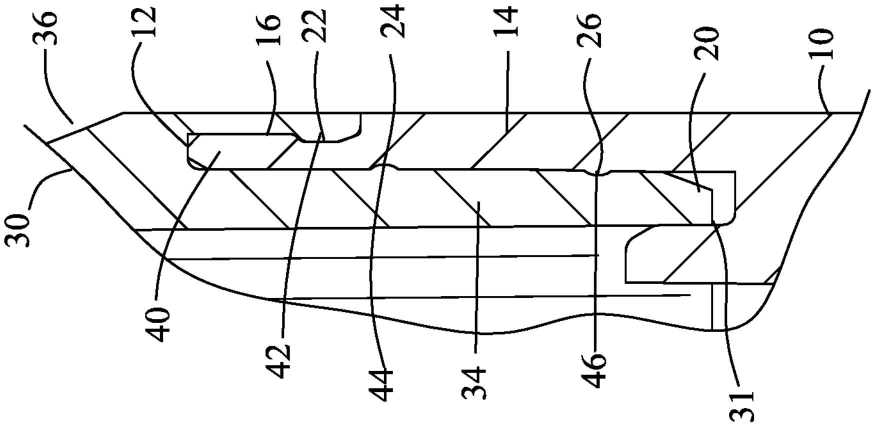
FIG. 16 is a magnified view of a portion of FIG. 15.
Figure 15:
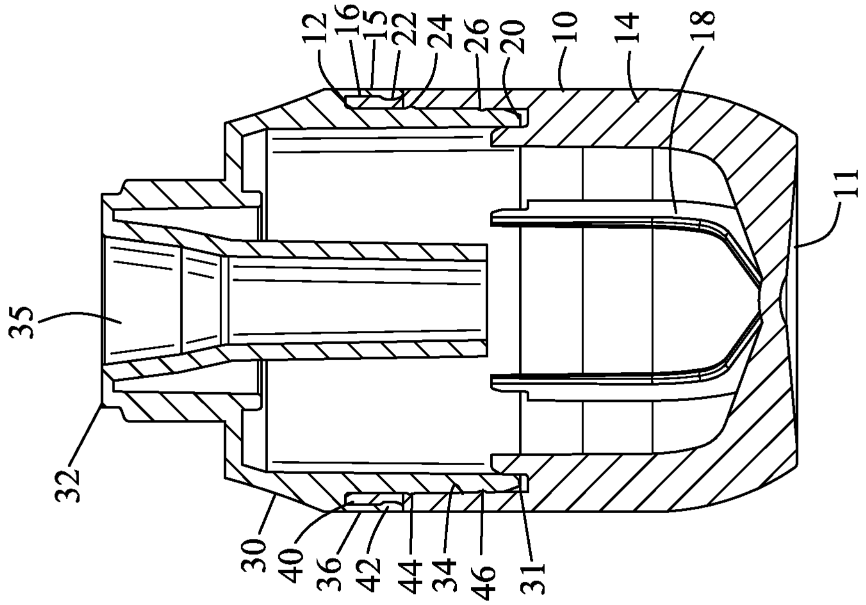
FIG. 15 is a view similar to FIG. 13 with the closure fully inserted into the container.

FIGS. 15 and 16 illustrate the closure 30 fully inserted into the container 10. The reduced cross-section sidewall 16 of the container 10 is shown fully inserted into the closure slot 40. The major projection 42 of the closure 30 is received within the major container depression 22. The resilience of the outer sidewall 36 of the closure 30 maintains the major projection 42 of the closure 30 within the major container depression 22.

The first closure end 31 is fully inserted into the container notch 20 of the container 10. The major closure projection 42 of the closure 30 is received within the major container depression 22 of the container 10. The minor closure projection 44 of the closure 30 is received within the minor container depression 24 of the container 10. The second minor projection 26 of the container 10 is received within the second minor depression 46 of the closure 30.

The deformable polymeric material of the container 10 and/or closure 30 enables the minor closure projection 44 of the closure 30 to be received within the minor container depression 24 of the container 10. Similarly, the deformable polymeric material of the container 10 and/or closure 30 enables the second minor projection 26 of the container 10 to be received within the second minor depression 46 of the closure 30.

The insertion of the first closure end 31 of the closure 30 within the container notch 20 of the container 10 biases the closure sidewall 34 against the container sidewall 14. The bias of the closure sidewall 34 against the container sidewall 14 maintains the engagement between the minor projections and minor depressions between the closure 30 and the container 10.

The number of engaging minor projections and minor depressions in part determines the strength of the coupling device 5. Adding or reducing the number of engaging minor projections and minor depressions between the container 10 and the closure 30 will add or subtract from the strength of the coupling device 5.

Figure 17:
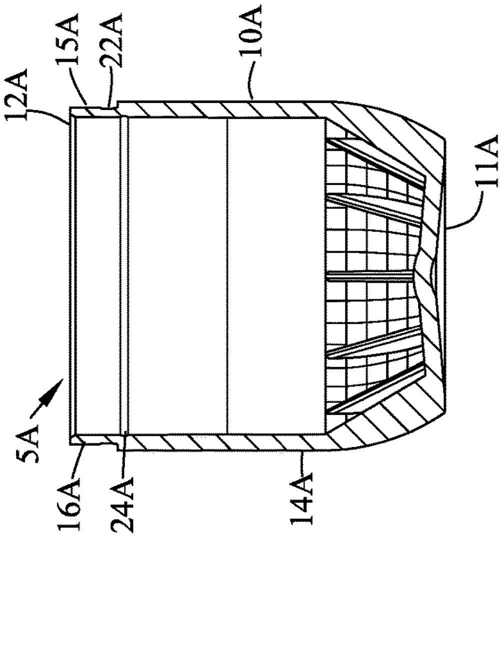
FIG. 17 is a side sectional view of a coupling device having a single major container depression of minimum depth in the container.

FIG. 17 is a side sectional view of a coupling device 5A having a major container depression 22A in the container 10A. In addition, the coupling device 5A includes a minor container depression 24A in the container 10A. The coupling device 5A includes a closure (as previously shown in FIGS. 7-10) having a major closure projection 42 and a minor closure projection 44. The major container depression 22A is shown having a minimum depth in contrast to FIGS. 18 and 19. The coupling device 5A provides a minimum engagement between the container 10A and the closure.

Figure 18:
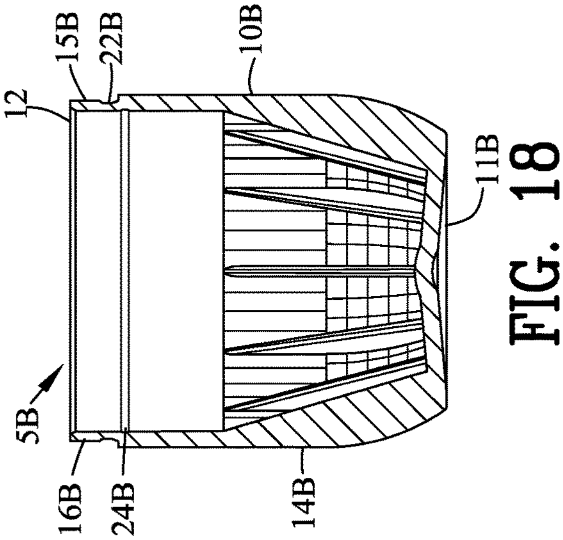
FIG. 18 is a side sectional view of a coupling device having a single major container depression of normal depth in the container.

FIG. 18 is a side sectional view of a coupling device 5B having a major container depression 22B in the container 10B. In addition, the coupling device 5B includes a minor container depression 24B in the container 10B. The coupling device 5B includes a closure (as previously shown in FIGS. 7-10) having a major closure projection 42 and a minor closure projection 44. The major container depression 22B and the minor container depression 24B are shown having depths commensurate with the depths of the major container depression 22 and the minor container depression 24 in FIGS. 2-6. The coupling device 5A provides a nominal engagement between the container 10A and the closure.

Figure 19:
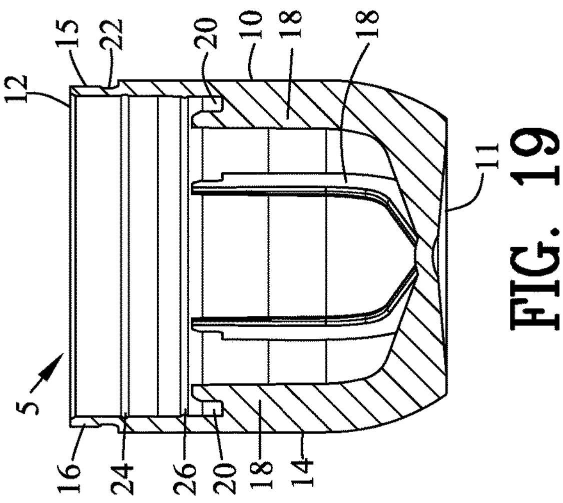
FIG. 19 is a view of the closure of FIG. 16.

FIG. 19 is a side sectional view of a coupling device 5 having a major container depression 22, a minor container depression 24 and a second minor container projection 26. The coupling device 5 includes a closure 30 (as previously shown in FIGS. 7-10) having a major closure projection 42 and a minor closure projection 44 and a second minor depression 46.

Figure 20:
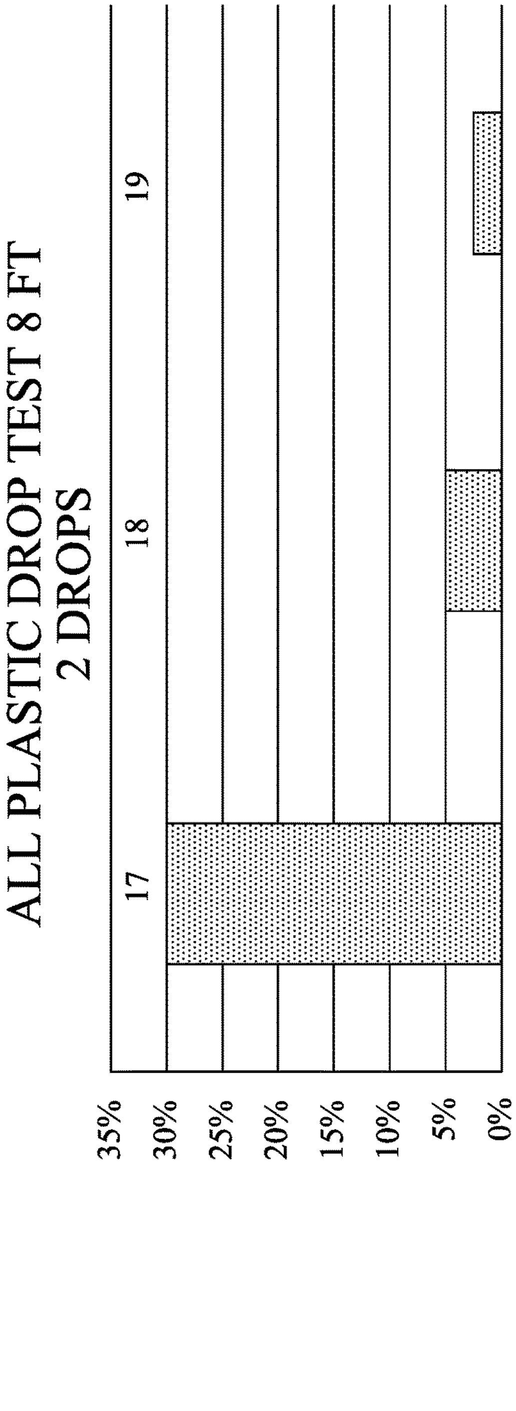
FIG. 20 is a graph of percentages of failure in a drop test for the closures shown in FIGS. 17-19.
Figure 21:
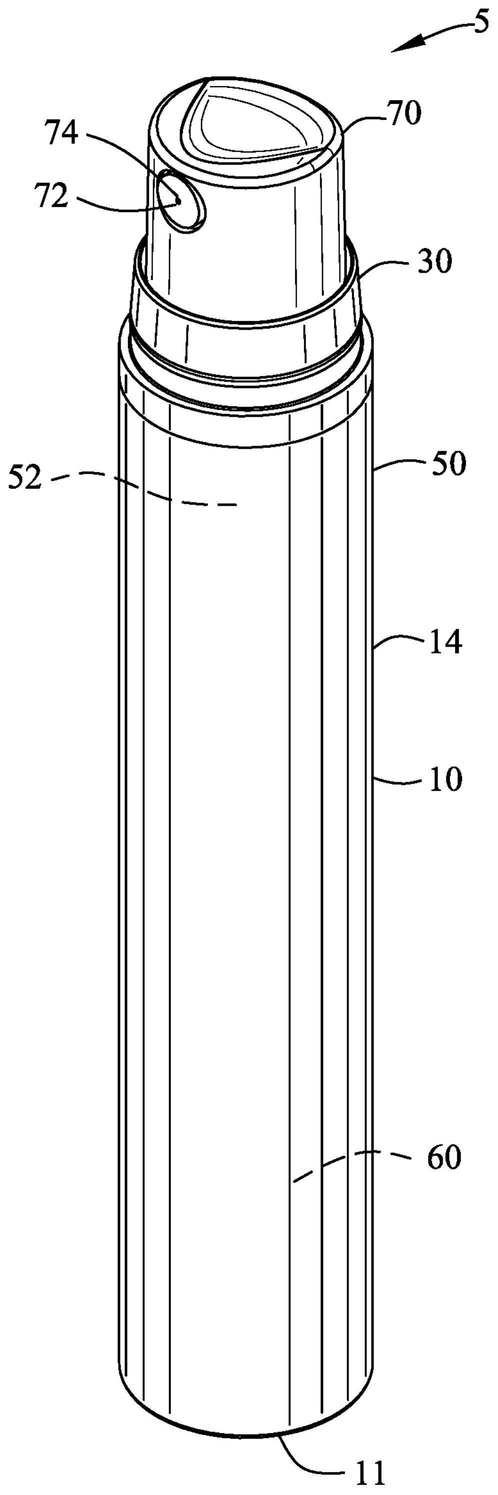
FIG. 21 is an isometric top view of a second embodiment of a closure connected to a liquid container.
Figure 22:
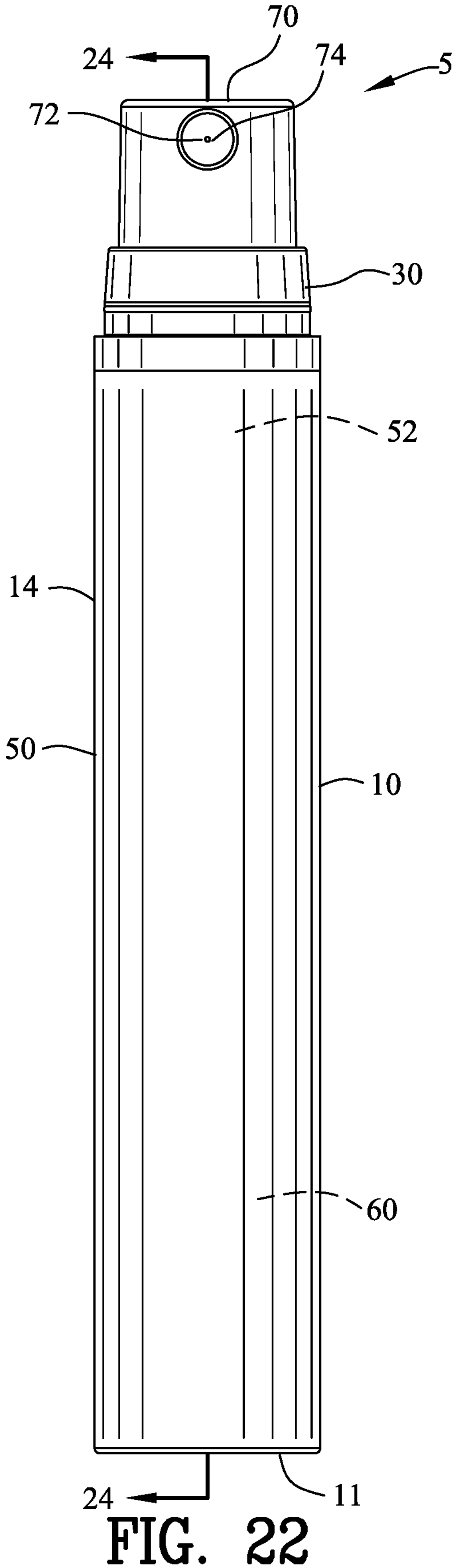
FIG. 22 is a side view of FIG. 21.
Figure 23:
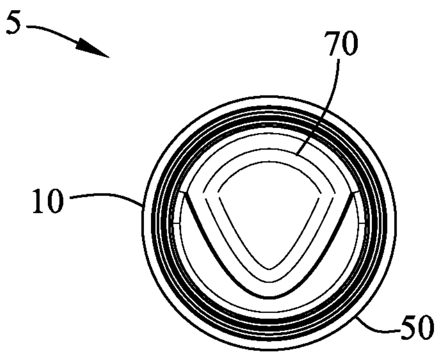
FIG. 23 is a top view of FIG. 22
Figure 24:
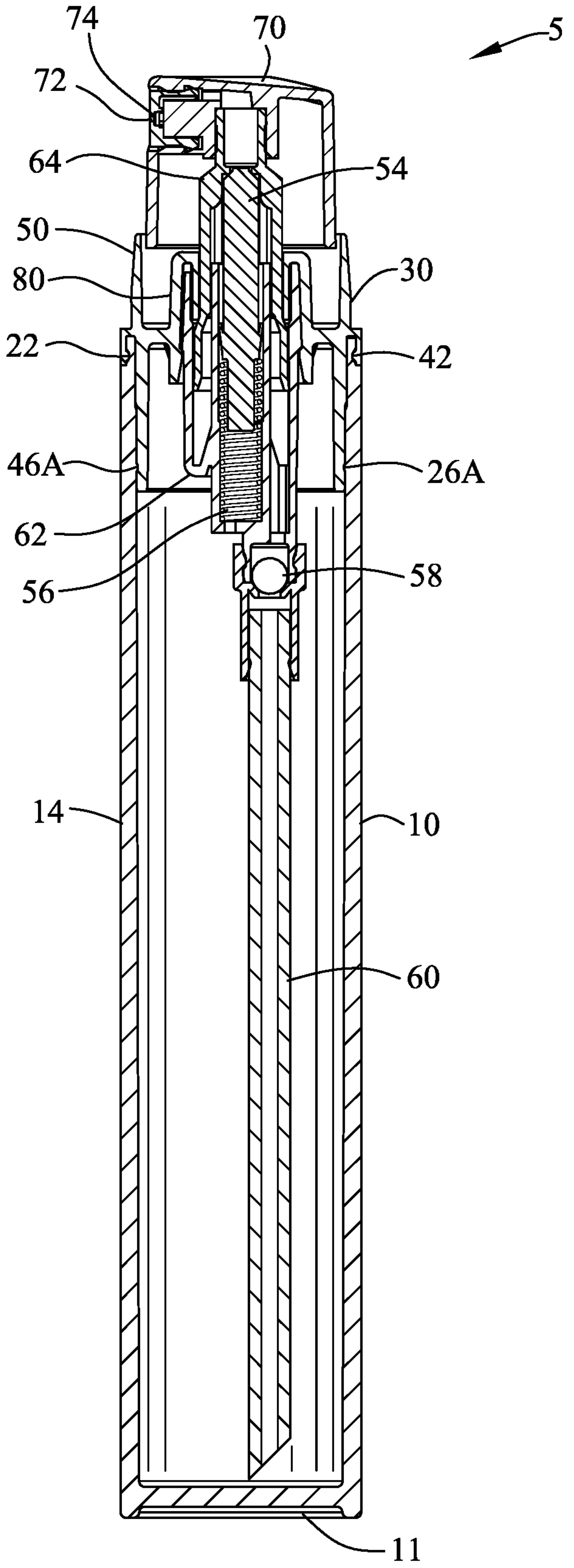
FIG. 24 is a sectional view along line 24-24 in FIG. 22.
Figure 25:
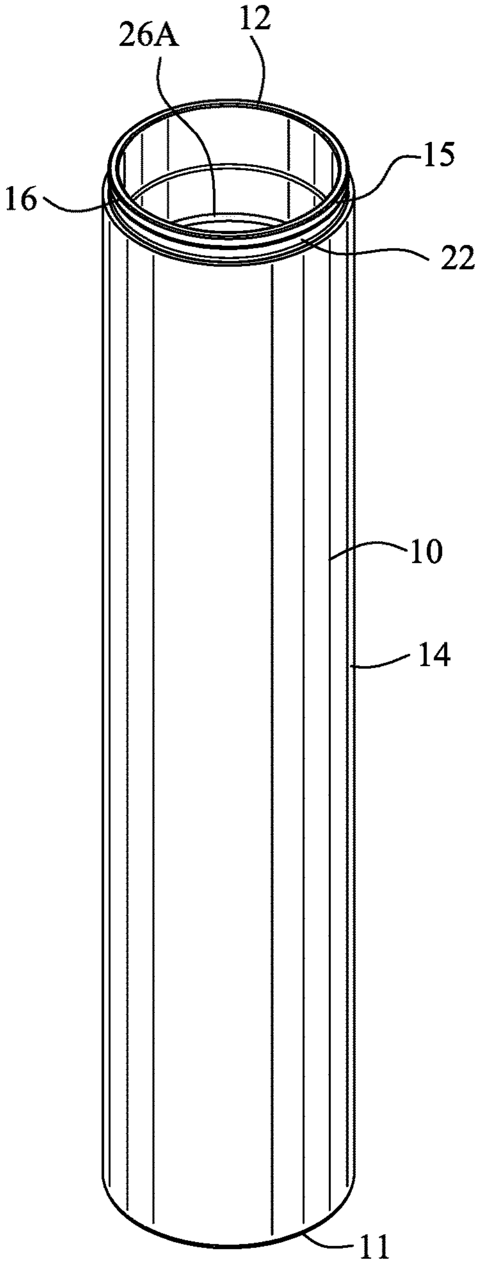
FIG. 25 is an isometric top view of the liquid container of FIGS. 21-22.
Figure 26:
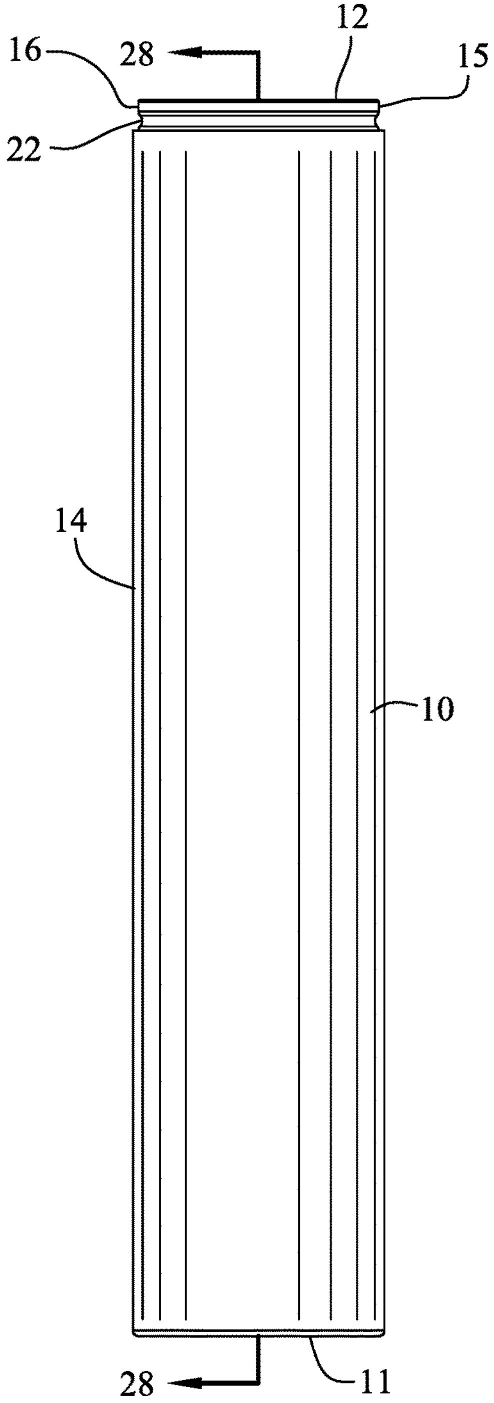
FIG. 26 is a side view of the liquid container of FIG. 25.
Figure 27:
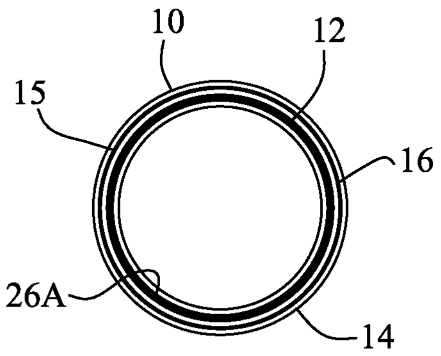
FIG. 27 is a top view of the liquid container of FIG. 26.
Figure 28:
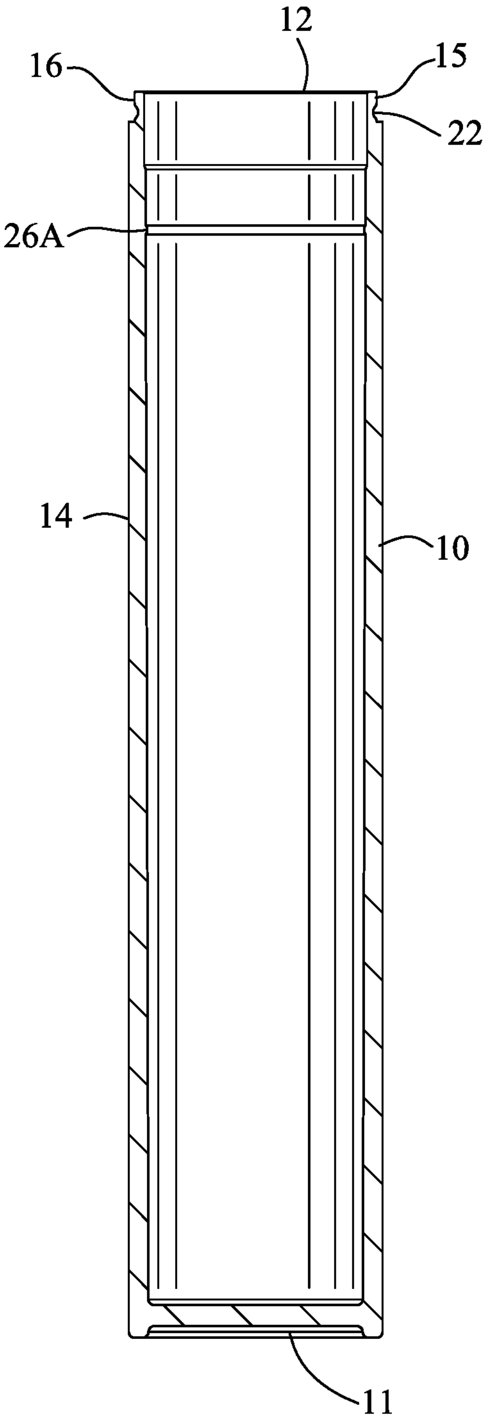
FIG. 28 is a sectional view along line 28-28 in FIG. 26.
Figure 30:
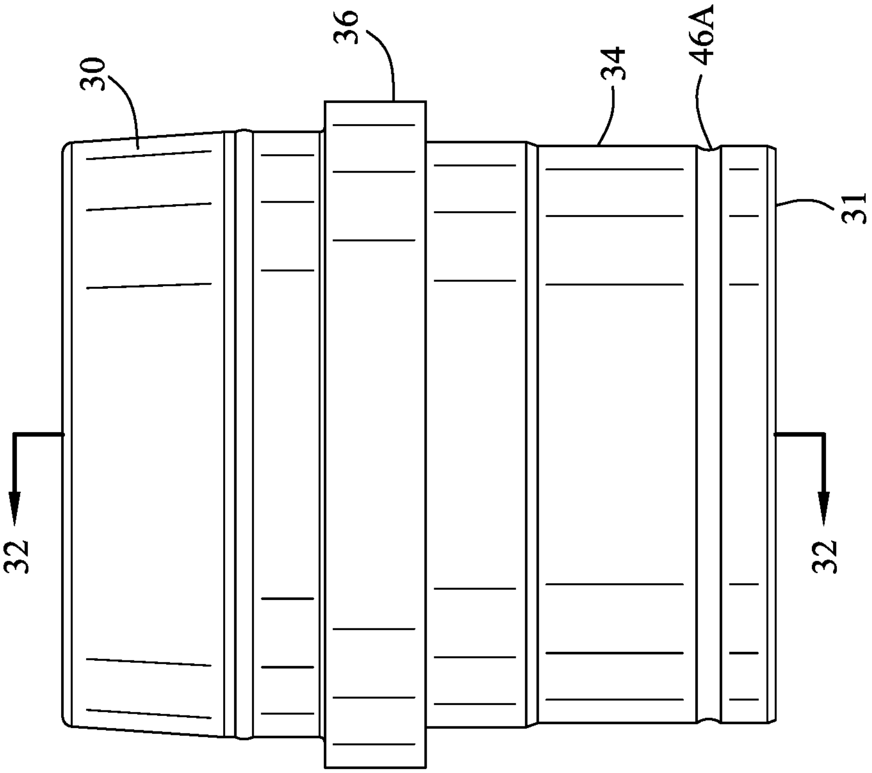
FIG. 30 is a side view of the closure of FIG. 29.
Figure 29:
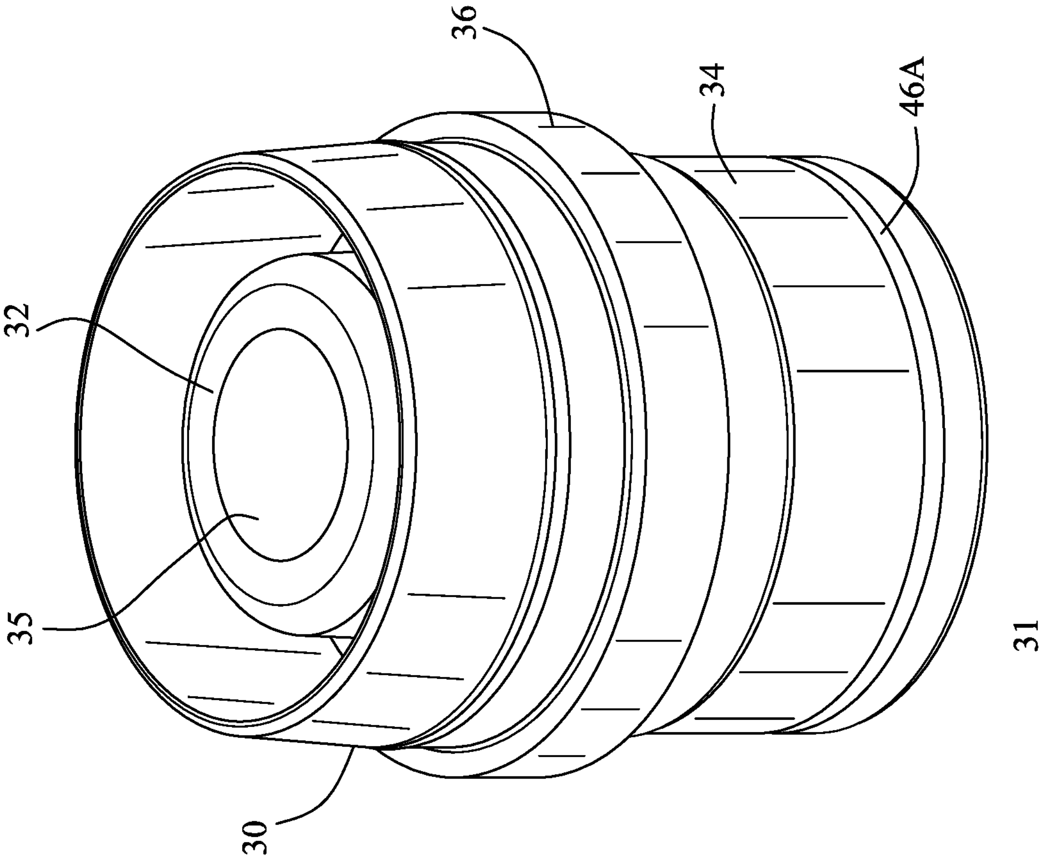
FIG. 29 is an isometric top view of the closure of FIGS. 21-22.
Figure 32:
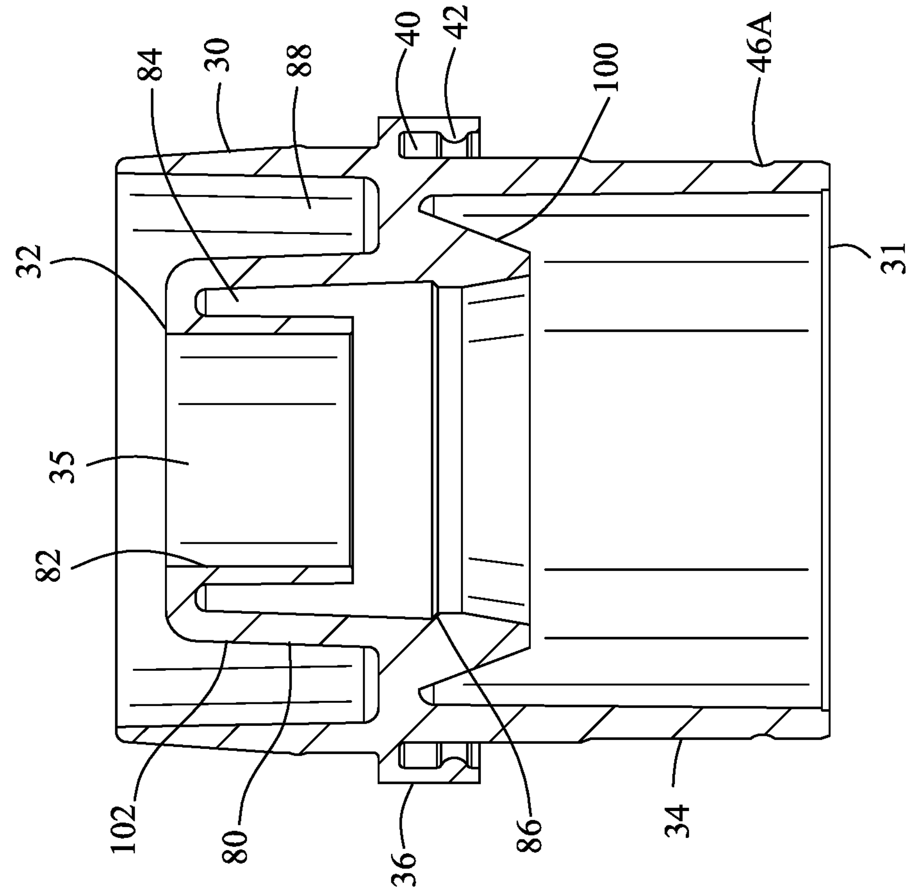
FIG. 32 is a sectional view along line 32-32 in FIG. 30.
Figure 31:
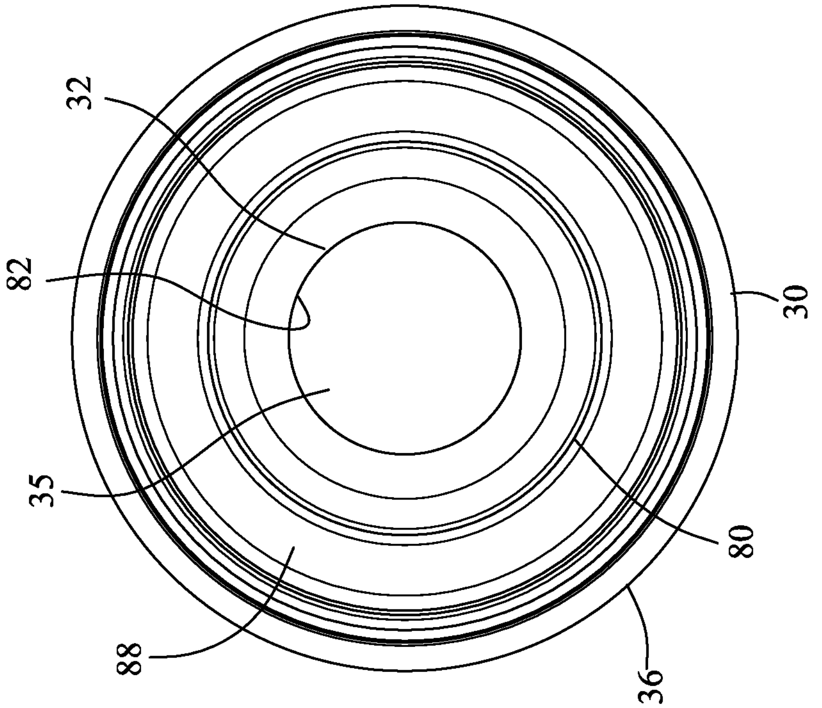
FIG. 31 is a top view of the closure component of FIG. 30.

FIG. 20 is a bar graph of percentages of failure in a drop test for the coupling devices shown in FIGS. 17-19. Failure means any liquid leakage through the coupling device 5A, 5B and 5.

The bar graph 17 represents the failure rate of the coupling device 5A shown in FIG. 17. The coupling device 5A provides a minimum engagement between the container 10A and the closure. The test represents two (2) drops of the coupling device 5A from a height of 8 feet onto an inelastic surface (not shown). The bar graph 17 shows a failure rate of seventeen (17%) percent.

The bar graph 18 represents the failure rate of the coupling device 5A shown in FIG. 18. The coupling device 5B has a major closure projection 42 and a minor closure projection 44 and provides a nominal engagement between the container 10A and the closure. The test represents two (2) drops of the coupling device 5B from a height of 8 feet onto an inelastic surface (not shown). The bar graph 18 shows a failure rate of five (5%) percent.

The bar graph 19 represents the failure rate of the coupling device 5 of the present invention shown in FIGS. 1-16 and FIG. 19. The coupling device 5 has the major container depression 22, the minor container depression 24 and the second minor container projection 26 engaging with the major closure projection 42 and the minor closure projection 44 and the second minor closure depression 46.

The test represents two (2) drop of the coupling device 5 from a height of 8 feet onto an inelastic surface (not shown). The bar graph 19 shows a failure rate of less than three (3%) percent.

FIGS. 21-38 illustrate a second embodiment of the coupling device 5. FIGS. 21-28 illustrate the container 10 in greater detail. The container 10 is formed from a deformable polymeric material. The container 10 has a container sidewall 14 extending between a first container end 11 and a second container end 12. In this example, the first container end 11 is a closed end whereas the second container end 12 is an open end. The second container end 12 of the container 10 has an undercut 15 providing a reduced cross-section sidewall 16.

In this example, a major container depression 22 is defined within an outer surface of the reduced cross-section sidewall 16. A minor container projection 26A is defined within an inside surface of the container sidewall 14. The major container depression 22 is spaced apart from the minor container projection 26A.

FIGS. 29-33 illustrate the closure 30 in greater detail. The closure 30 is formed from a deformable polymeric material. The closure 30 has a closure sidewall 34 extending between a first closure end 31 and a second closure end 32. In this example, the first closure end 31 is an open end whereas the second container end 32 defines an internal channel 35.

An outer closure sidewall 36 is located radially outward from the closure sidewall 34 defining a slot 40 between the closure sidewall 34 and the outer sidewall 36. The closure outer sidewall 36 is resilient for resiliently engaging with the container 10. The function of the closure outer sidewall 36 and the slot 40 will be discussed in greater detail with reference to FIGS. 34-38.

As best shown in FIGS. 29-32, a major closure projection 42 is defined on an inner surface of the outer closure sidewall 36. A minor closure depression 46A is defined within the outside surface of the closure sidewall 34. The major closure projection 42 is spaced apart from the minor closure depression 46A along the closure 30. The major container depression 22 and the minor container projection 26A of the container 10 are spaced similarly to the major closure projection 42 and the minor closure of the closure 30.

Figure 33:
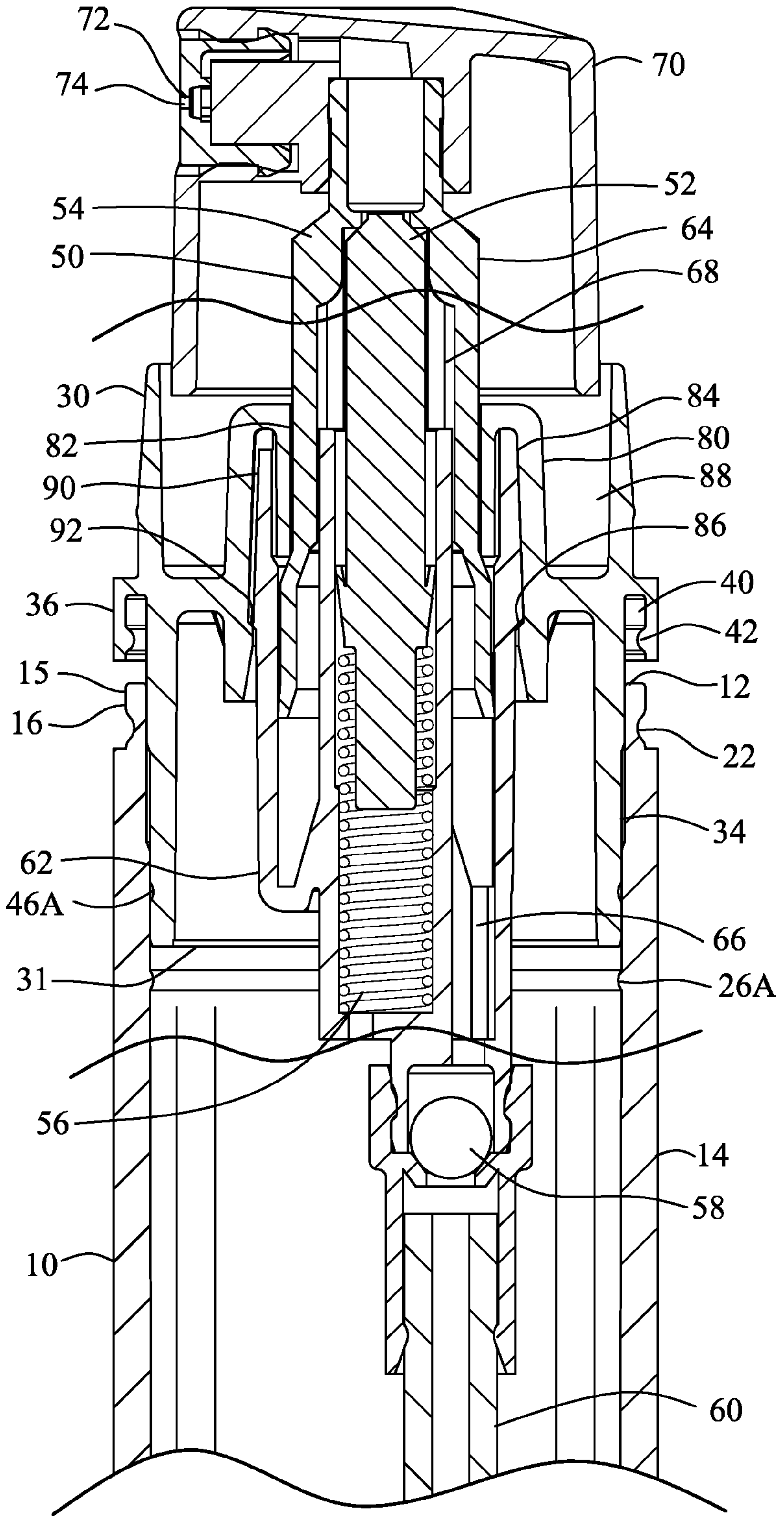
FIG. 33 is an enlarged sectional view of a portion of FIG. 24 with the closure position adjacent to the container.
Figure 34:
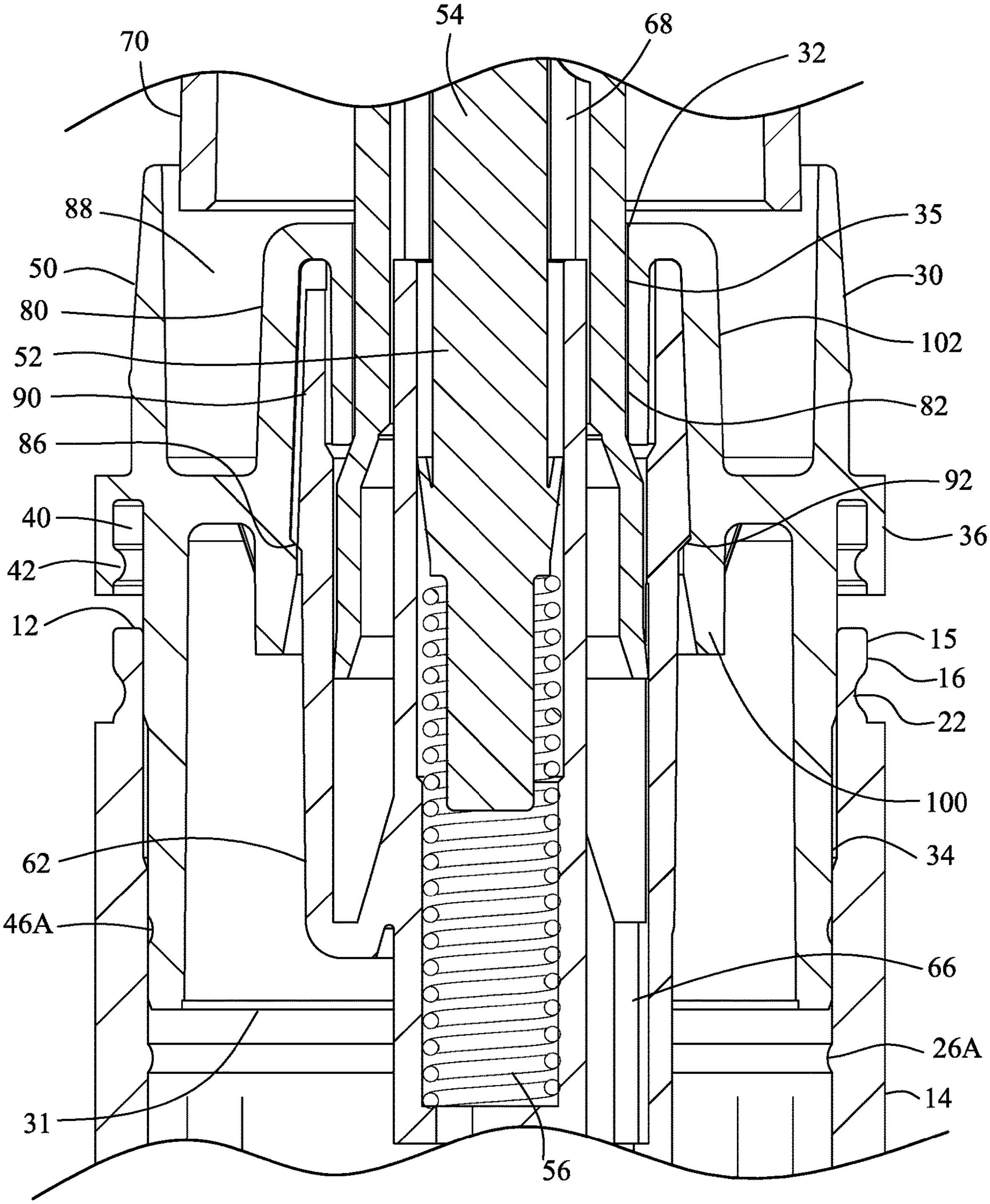
FIG. 34 is a magnified view of a portion of FIG. 33.

FIGS. 33 and 34 illustrate the closure 30 position adjacent to the container 10. The closure sidewall 34 is inserted partially within the container sidewall 14. Preferably, the closure sidewall 34 forms a sliding seal with the container sidewall 14 to align the closure 30 to the container sidewall 14. The closure sidewall 34 is inserted within the container sidewall 14 prior to the reduced cross-section sidewall 16 of the container 10 entering into the closure slot 40.

Figure 35:
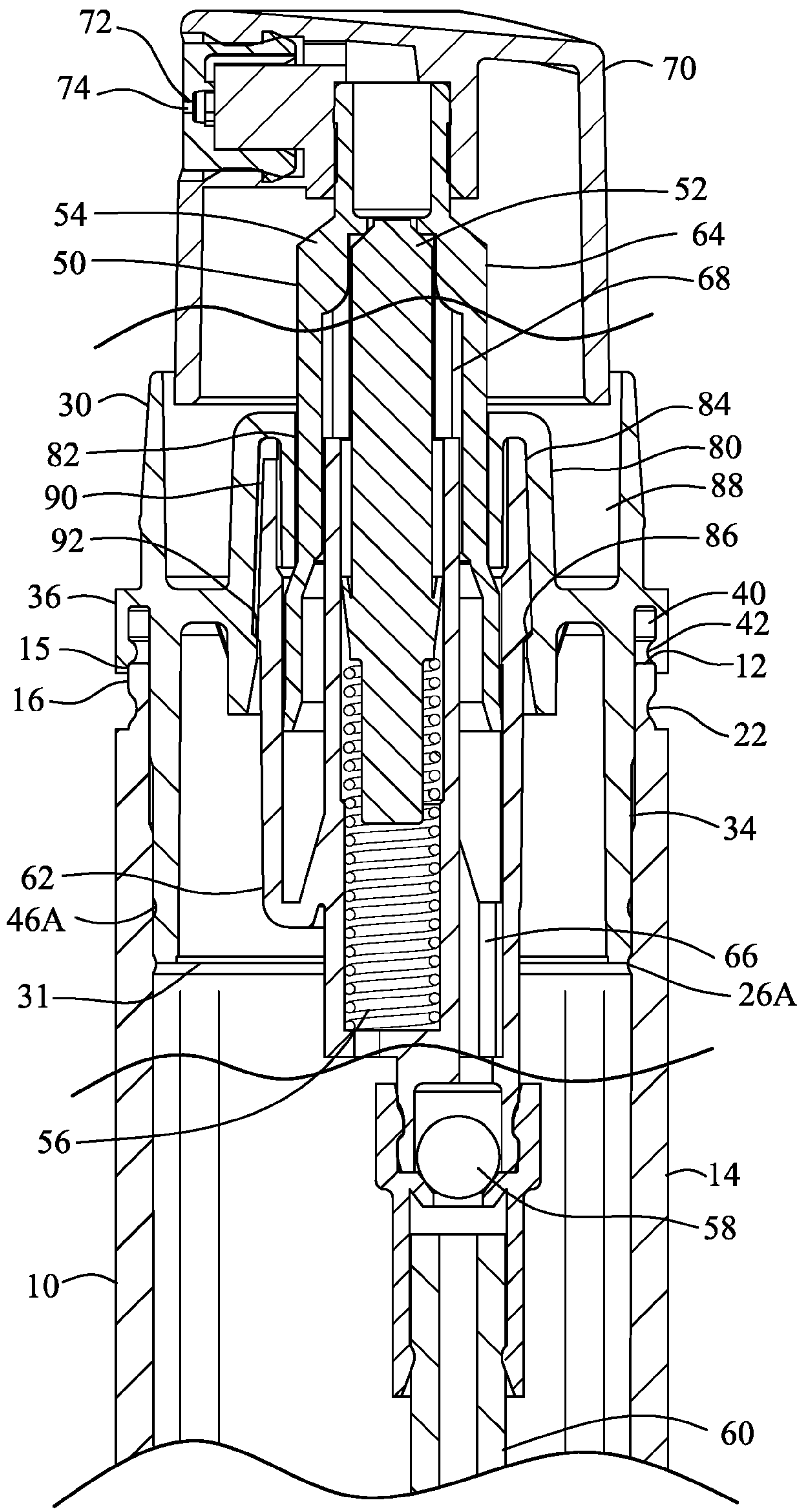
FIG. 35 is a view similar to FIG. 33 with the closure partially inserted into the container.
Figure 36:
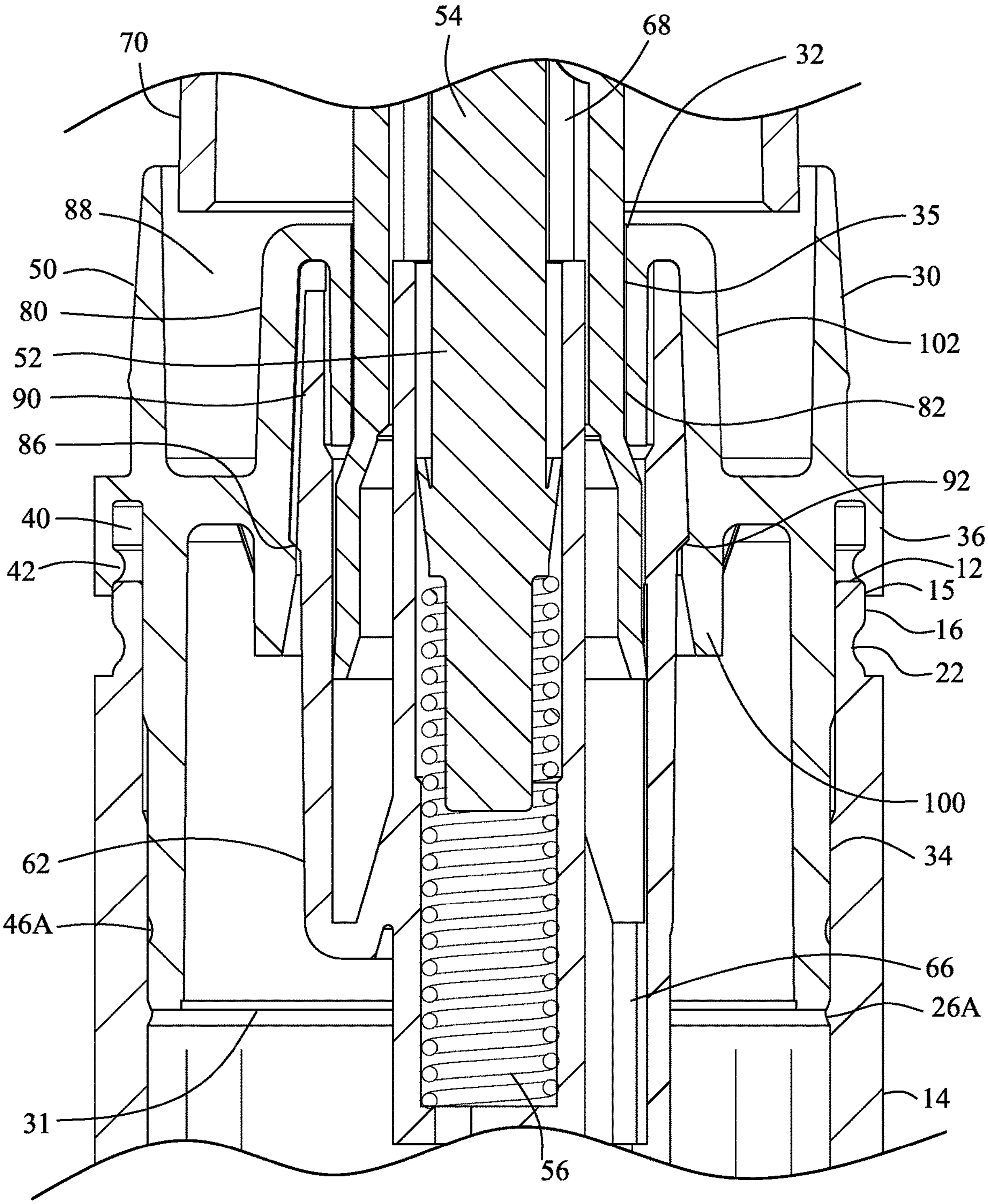
FIG. 36 is a magnified view of a portion of FIG. 35.

FIGS. 35 and 36 illustrate the closure 30 partially inserted into the container 10. The reduced cross-section sidewall 16 of the container 10 is shown entering into the closure slot 40. The reduced cross-section sidewall 16 of the container 10 enters the closure slot 40 prior to the first closure end 31 entering into the notch 20 of the container 10. The major projection 42 of the closure 30 engages with the reduced cross-section sidewall 16 of the container 10 and results in the outer sidewall 36 of the closure 30 flexing radially outwardly as best shown in FIG. 36.

Figure 37:
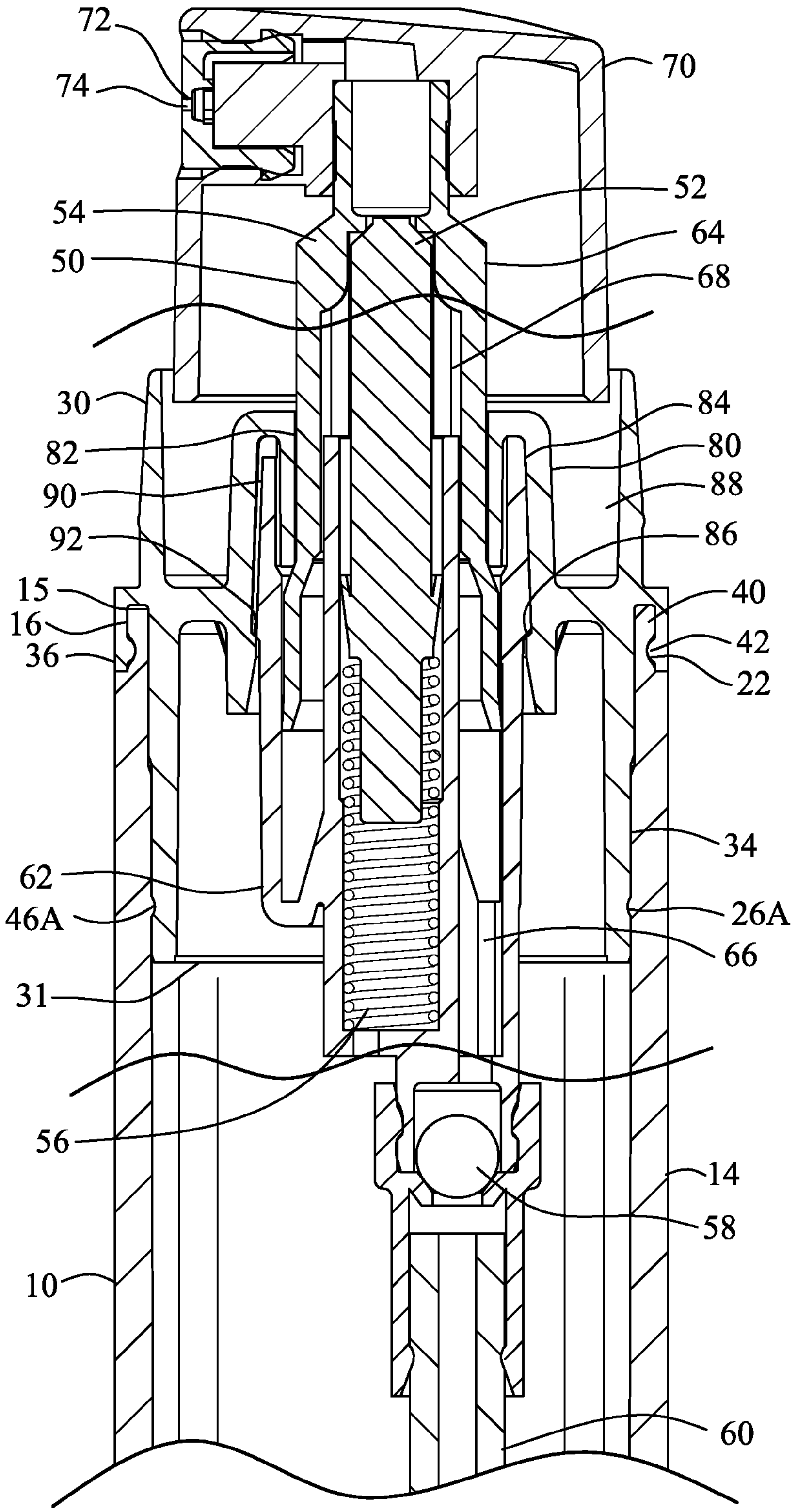
FIG. 37 is a view similar to FIG. 35 with the closure fully inserted into the container.
Figure 38:
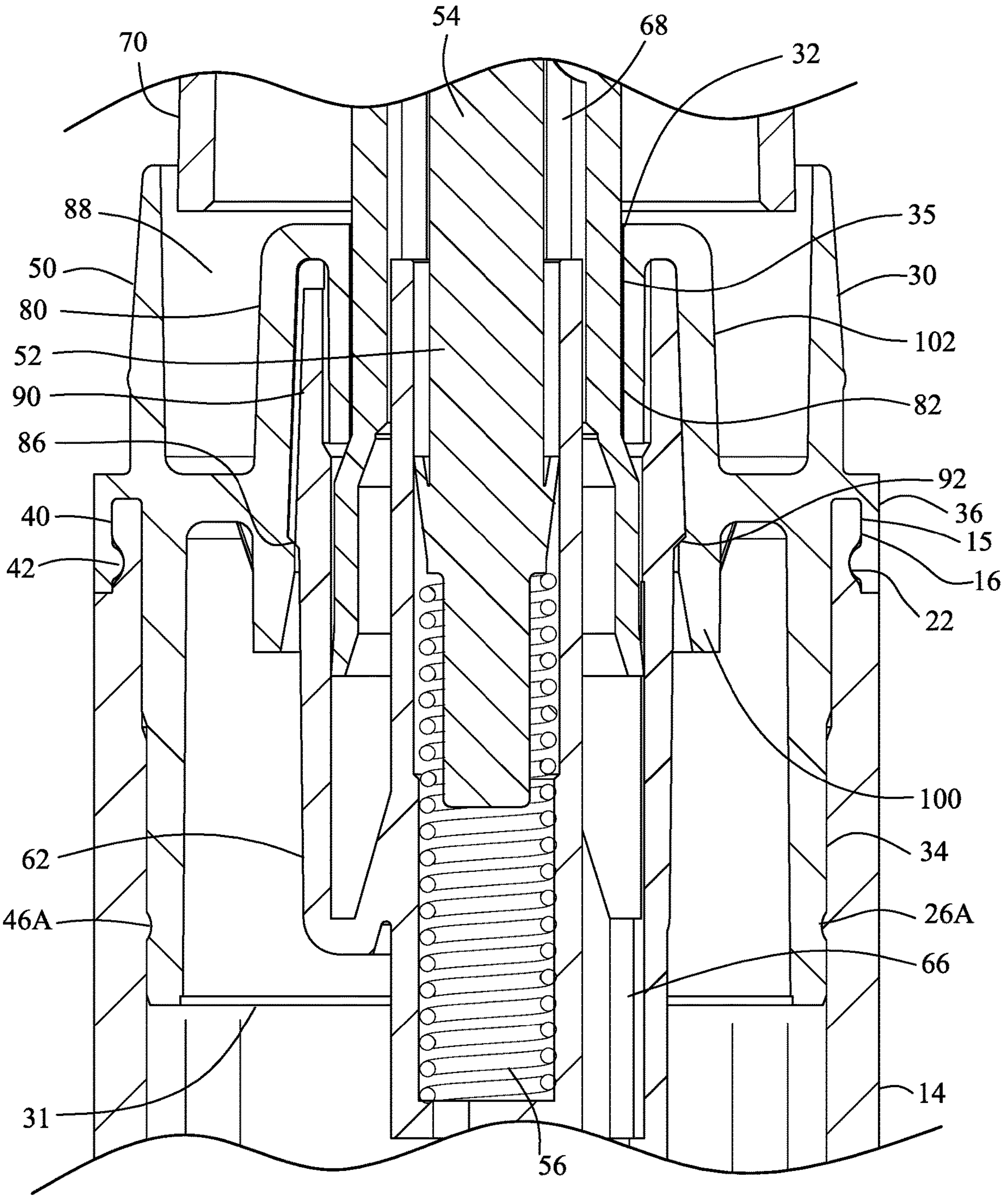
FIG. 38 is a magnified view of a portion of FIG. 37.

FIGS. 37 and 38 illustrate the closure 30 fully inserted into the container 10. The reduced cross-section sidewall 16 of the container 10 is shown fully inserted into the closure slot 40. The major projection 42 of the closure 30 is received within the major container depression 22. The resilience of the outer sidewall 36 of the closure 30 maintains the major projection 42 of the closure 30 within the major container depression 22.

The first closure end 31 is fully inserted into the container notch 20 of the container 10. The major closure projection 42 of the closure 30 is received within the major container depression 22 of the container 10. The minor closure depression 46A of the closure 30 is received within the minor container projection 26A of the container 10.

The deformable polymeric material of the container 10 and/or closure 30 enables the major closure projection 42 of the closure 30 to be received within the minor container projection 26A of the container 10. Similarly, the deformable polymeric material of the container 10 and/or closure 30 enables the minor container projection 26A of the container 10 to be received within the minor closure depression 46A of the closure 30.

The insertion of the first closure sidewall 34 of the closure 30 within the container 10 biases the closure sidewall 34 against the container sidewall 14. The bias of the closure sidewall 34 against the container sidewall 14 maintains the engagement between the minor projections and minor depressions between the closure 30 and the container 10.

The number of engaging minor projections and minor depressions in part determines the strength of the coupling device 5. Adding or reducing the number of engaging minor projections and minor depressions between the container 10 and the closure 30 will add or subtract from the strength of the coupling device 5.

The second embodiment as shown in FIGS. 21-38 incorporates a liquid pump dispenser 50. The liquid pump dispenser 50 includes a pump 52 having a piston 54 being biased in an ascending position by a spring 56. A ball check valve 58 is positioned between a dip tube 60 and the piston 54. The pump 52 may include a lower pump body 62 and an upper pump body 64. The pump includes an input channel 66 for inputting the fluid into the pump 52 and an output channel 68 for outputting the fluid from the pump 52. An actuator 70 is utilized to operate the pump 52. A nozzle 72 discharges the fluid from the pump liquid dispenser 50. The pump liquid dispenser 50 may further include an atomizer 74 for producing a fine liquid mist.

The closure 30 may include a closure receptacle 80. A closure pump channel 82 is within the closure receptacle 80. Preferably, the closure receptacle 80 and the closure 30 are constructed from an integral one-piece unit including a deformable polymeric material. The pump 52 engages within the closure pump channel 82 for coupling the pump 52 to the closure receptacle 80 and is configured for dispensing from the container 10. The closure 30 may further include an extension wall defining a closure annular channel 88. The closure annular channel 88 receives an actuator 70.

Preferably, the closure receptacle 80 includes a lower male body 100 and an upper female body 102. The upper female body 102 of the closure receptacle 80 defines a closure pump slot 84. The lower pump body 62 of the pump 52 may include a pump body mounting wall 90. The pump mounting wall 90 is received within the closure pump slot 84 for coupling the pump 52 to the closure 30.

A closure pump locking step 86 may be coupled to the closure receptacle 80. A pump locking step 92 may be coupled to the pump body mounting wall 90 of the pump 52. The closure pump locking step 86 and the pump locking step 92 cooperate for securing the pump 52 within the closure receptacle 80. The upper pump body 64 biases the pump body mounting wall 90 against the closure receptacle 84 for maintaining the engagement between the closure pump locking step 86 and the pump body locking step 92 and maintaining the pump 52 within the closure receptacle 80. Furthermore, the lower male body 100 biases the pump 52 against the upper female body 102.

The present disclosure includes that contained in the appended claims as well as the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A coupling device, comprising;

a container having a container sidewall extending between a first container end and a second container end;

a container undercut defined in an outer surface of said container sidewall defining said second container end forming a reduced cross-section;

a container notch located within said container;

a closure having a closure sidewall extending between a first closure end and a second closure end;

a closure outer sidewall located radially outward from said closure sidewall defining a slot between said closure sidewall and said closure outer sidewall;

said second container end being received within said slot of said closure;

said first closure end being received within said notch of said container;

a major projection and a major depression located between said second container end and said slot of said closure cooperating for securing said closure to said container; and a minor projection and a minor depression located between said container sidewall and said closure sidewall for cooperating for additionally securing said closure to said container.

2. The coupling device as set forth in claim 1, wherein said first container end is a closed end and second container end is an open end.

3. The coupling device as set forth in claim 1, wherein including a plurality of container ribs supporting an inside surface of said container sidewall.

4. The coupling device as set forth in claim 1, including a plurality of container ribs supporting an inside surface of said container sidewall; and said container notch being located within said container ribs.

5. The coupling device as set forth in claim 1, including a second minor projection and a second minor depression engaged between said container sidewall and said closure sidewall for locking said closure to said container.

6. The coupling device as set forth in claim 1, including a second minor projection and a second minor depression engaged between said container sidewall and said closure sidewall for locking said closure to said container; and said second minor projection and said second minor depression being opposite to said minor projection and said minor depression.

7. The coupling device as set forth in claim 1, wherein said closure outer sidewall is resilient for enabling said resilient engagement between said major projection and said major depression.

8. The coupling device as set forth in claim 1, wherein said container and said closure are formed from a deformable polymeric material.

9. The coupling device as set forth in claim 1, wherein said second container end is received within said slot of said closure prior to said first closure end being receivable within said notch of said container.

10. The coupling device as set forth in claim 1, wherein said container notch biases said closure sidewall against said container sidewall.

11. A coupling, comprising;

a container having a container sidewall extending between a first container end and a second container end;

a container undercut defined in an outer surface of said container sidewall defining said second container end forming a reduced cross-section;

a container notch located within said container;

a closure having a closure sidewall extending between a first closure end and a second closure end;

a closure outer sidewall located radially outward from said closure sidewall defining a slot between said closure sidewall and said closure outer sidewall;

said second container end being received within said slot of said closure;

said first closure end being receivable within said notch of said container;

a major projection extending from said closure outer sidewall for engaging with a major depression defined within said second container end for securing said closure to said container; and a minor projection and a minor depression located between said container sidewall and said closure sidewall for cooperating for additionally securing said closure to said container.

* * * * *